(12) United States Patent
Olsen et al.

(10) Patent No.: US 12,398,827 B2
(45) Date of Patent: Aug. 26, 2025

(54) MITIGATION OF BUCKLING IN SUBSEA PIPELINES

(71) Applicant: Subsea 7 Norway AS, Stavanger (NO)

(72) Inventors: Christian Linde Olsen, Stavanger (NO); Fartein Thorkildsen, Sola (NO)

(73) Assignee: SUBSEA 7 NORWAY AS, Stavanger (NO)

( * ) Notice: Subject to any disclaimer, the term of this patent is extended or adjusted under 35 U.S.C. 154(b) by 94 days.

(21) Appl. No.: 17/802,119

(22) PCT Filed: Feb. 24, 2021

(86) PCT No.: PCT/EP2021/054619
§ 371 (c)(1),
(2) Date: Aug. 24, 2022

(87) PCT Pub. No.: WO2021/170689
PCT Pub. Date: Sep. 2, 2021

(65) Prior Publication Data
US 2023/0358336 A1    Nov. 9, 2023

(30) Foreign Application Priority Data
Feb. 24, 2020 (GB) .................................. 2002574.8

(51) Int. Cl.
*F16L 1/16* (2006.01)
*F16L 1/18* (2006.01)
(Continued)

(52) U.S. Cl.
CPC ............... *F16L 1/18* (2013.01); *F16L 1/206* (2013.01); *F16L 57/02* (2013.01)

(58) Field of Classification Search
CPC ..... F16L 1/23; F16L 1/18; F16L 1/203; F16L 1/123; F16L 1/20; F16L 3/20;
(Continued)

(56) References Cited

U.S. PATENT DOCUMENTS 1,079,758 A * 11/1913 Gray ......................... F16L 3/18
248/55
1,928,570 A * 9/1933 Mustico ................ F16L 55/172
285/373
(Continued)

FOREIGN PATENT DOCUMENTS

BR    PI0803572-5 W    10/2011
CN    109695780 W     4/2019
(Continued)

OTHER PUBLICATIONS

International Preliminary Report on Patentabilty received in corresponding International Application No. PCT/EP2021/054619 dated Sep. 27, 2021.
(Continued)

*Primary Examiner* — Edwin J Toledo-Duran
(74) *Attorney, Agent, or Firm* — MATTINGLY & MALUR, PC

(57) ABSTRACT

A subsea pipeline (14) has a friction-reducing outer coating, treatment or finish (30) that extends along discrete regions mutually spaced along the length of the pipeline. During laying, curvature is imparted to the pipeline (14) along its length, for example by the residual curvature method or by snake-lay, to create expansion loops (26) of increased curvature relative to intermediate portions (28) of the pipeline (14) that join those loops (26). Each of the loops (26) is coincident with a respective one of the regions that bear the friction-reducing outer coating, treatment or finish (30). This facilitates lateral movement of the loops (26) relative to the seabed (16) to mitigate and control buckling in use of the pipeline (14).

22 Claims, 4 Drawing Sheets

(51) Int. Cl.
*F16L 1/20* (2006.01)
*F16L 57/02* (2006.01)

(58) Field of Classification Search
CPC ... F16L 1/206; F16L 57/02; F16L 1/16; F16L 1/19; F16L 11/12; F16L 1/161; E21B 17/012; E21B 17/017; E21B 43/01
See application file for complete search history.

(56) References Cited

U.S. PATENT DOCUMENTS

| | | | | |
|---|---|---|---|---|
| 1,991,495 | A * | 2/1935 | Derby | G01K 5/68 |
| | | | | 374/E5.04 |
| 3,173,271 | A * | 3/1965 | Wittgenstein | F16L 1/14 |
| | | | | 405/172 |
| 3,379,027 | A * | 4/1968 | Mowell | F16L 59/141 |
| | | | | 405/184.5 |
| 3,388,724 | A * | 6/1968 | Mascenik | F16L 59/141 |
| | | | | 138/149 |
| 3,526,525 | A * | 9/1970 | Versoy | B28B 19/0038 |
| | | | | 156/213 |
| 3,698,348 | A * | 10/1972 | Morgan | F16L 1/165 |
| | | | | 114/253 |
| 3,835,656 | A * | 9/1974 | McDermott | F16L 1/163 |
| | | | | 405/170 |
| 4,075,862 | A * | 2/1978 | Ames | F16L 1/26 |
| | | | | 166/347 |
| 4,102,137 | A * | 7/1978 | Porraz | E02B 3/127 |
| | | | | 405/172 |
| 4,128,219 | A * | 12/1978 | Kaigler, Jr. | F16L 1/026 |
| | | | | 248/55 |
| 4,132,084 | A * | 1/1979 | Francisco-Arnold | F16L 1/14 |
| | | | | 405/172 |
| 4,683,156 | A * | 7/1987 | Waters | E02D 17/20 |
| | | | | 405/20 |
| 5,018,903 | A * | 5/1991 | O'Donnell | F16L 1/26 |
| | | | | 166/341 |
| 5,279,368 | A * | 1/1994 | Arnott | F16L 58/16 |
| | | | | 138/143 |
| 5,403,121 | A * | 4/1995 | Lanan | F16L 51/04 |
| | | | | 405/166 |
| 5,421,674 | A * | 6/1995 | Maloberti | F16L 11/083 |
| | | | | 405/169 |
| 5,582,252 | A * | 12/1996 | Richmond | E21B 43/01 |
| | | | | 166/359 |
| 5,615,977 | A * | 4/1997 | Moses | F16L 1/163 |
| | | | | 405/195.1 |
| 6,004,072 | A * | 12/1999 | Cunningham | F16L 41/06 |
| | | | | 285/31 |
| 6,270,387 | B1 * | 8/2001 | Nesheim | E21B 17/012 |
| | | | | 405/211 |
| 6,315,006 | B1 * | 11/2001 | Opperthauser | F16L 59/20 |
| | | | | 138/149 |
| 6,439,808 | B1 * | 8/2002 | Smidt | F16L 1/123 |
| | | | | 405/172 |
| 6,450,736 | B1 * | 9/2002 | Eck | F16L 1/0246 |
| | | | | 248/62 |
| 6,811,355 | B2 * | 11/2004 | Poldervaart | B63B 22/026 |
| | | | | 405/172 |
| 6,910,830 | B2 * | 6/2005 | Endal | F16L 1/23 |
| | | | | 405/168.1 |
| 7,028,717 | B1 * | 4/2006 | Keyes | F16L 59/166 |
| | | | | 285/47 |
| 7,214,114 | B2 * | 5/2007 | Gibson | E21B 17/012 |
| | | | | 441/133 |
| 7,819,608 | B2 * | 10/2010 | Joshi | F16L 1/163 |
| | | | | 405/169 |
| 8,721,222 | B2 * | 5/2014 | Mebarkia | E21B 17/012 |
| | | | | 405/154.1 |
| 8,961,071 | B2 * | 2/2015 | Critsinelis | F16L 1/123 |
| | | | | 405/173 |
| 9,709,191 | B2 * | 7/2017 | Brunet | F16L 1/205 |
| 10,344,893 | B2 * | 7/2019 | Pigliapoco | F16L 1/19 |
| 2004/0062611 | A1 * | 4/2004 | Endal | F16L 1/203 |
| | | | | 405/168.1 |
| 2004/0231743 | A1 * | 11/2004 | Keyes | F16L 59/143 |
| | | | | 138/146 |
| 2005/0061382 | A1 * | 3/2005 | Chenin | F16L 9/045 |
| | | | | 138/121 |
| 2006/0060256 | A1 * | 3/2006 | Keyes | F16L 59/15 |
| | | | | 138/120 |
| 2008/0232905 | A1 * | 9/2008 | Duroch | F16L 1/24 |
| | | | | 405/168.2 |
| 2008/0274656 | A1 * | 11/2008 | Routeau | H02G 9/12 |
| | | | | 441/133 |
| 2009/0185868 | A1 * | 7/2009 | Masters | F15D 1/10 |
| | | | | 405/211 |
| 2009/0313794 | A1 * | 12/2009 | Denniel | F16L 1/24 |
| | | | | 405/169 |
| 2010/0018717 | A1 * | 1/2010 | Espinasse | E21B 17/012 |
| | | | | 166/346 |
| 2010/0096021 | A1 * | 4/2010 | Keyes | F16L 59/15 |
| | | | | 137/15.01 |
| 2012/0257931 | A1 * | 10/2012 | Tkaczyk | F16L 1/203 |
| | | | | 405/184.2 |
| 2014/0361529 | A1 * | 12/2014 | McCormick | F16L 51/00 |
| | | | | 285/55 |
| 2015/0345275 | A1 * | 12/2015 | Sathananthan | E02B 17/04 |
| | | | | 210/175 |
| 2016/0061352 | A1 * | 3/2016 | Brunet | F16L 3/20 |
| | | | | 405/166 |
| 2016/0097872 | A1 * | 4/2016 | Fernihough | G02B 6/4427 |
| | | | | 367/15 |
| 2017/0108143 | A1 * | 4/2017 | Moen | F16L 1/16 |
| 2018/0010713 | A1 * | 1/2018 | Endal | F16L 1/163 |
| 2018/0356003 | A1 * | 12/2018 | Lodeho | F16L 59/143 |
| 2018/0372244 | A1 * | 12/2018 | Swanson | E21B 43/013 |
| 2019/0011062 | A1 * | 1/2019 | Olsen | E21B 41/0007 |
| 2019/0056043 | A1 * | 2/2019 | Endal | F16L 1/26 |

FOREIGN PATENT DOCUMENTS

| | | |
|---|---|---|
| EP | 1 358 420 A0 | 7/2002 |
| EP | 2 042 794 A1 | 4/2009 |
| GB | 2492414 A | 1/2013 |
| GB | 2551786 A | 1/2018 |
| WO | 2013/066431 A1 | 5/2013 |
| WO | 2014/147354 W | 9/2014 |
| WO | 2018/102196 A1 | 6/2018 |

OTHER PUBLICATIONS

International Search Report received in corresponding International Application No. PCT/EP2021/054619.

Written Opinion received in corresponding International Application No. PCT/EP2021/054619.

United Kingdom Examination Report received in corresponding United Kingdom Application No. GB2002574.8 dated May 10, 2022.

Norwegian Office Action received in corresponding Norwegian U.S. Appl. No. 20/200,226 dated Aug. 31, 2020.

United Kingdom Combined Search and Examination Report received in corresponding United Kingdom Application No. GB2002574.8 dated Dec. 11, 2020.

* cited by examiner

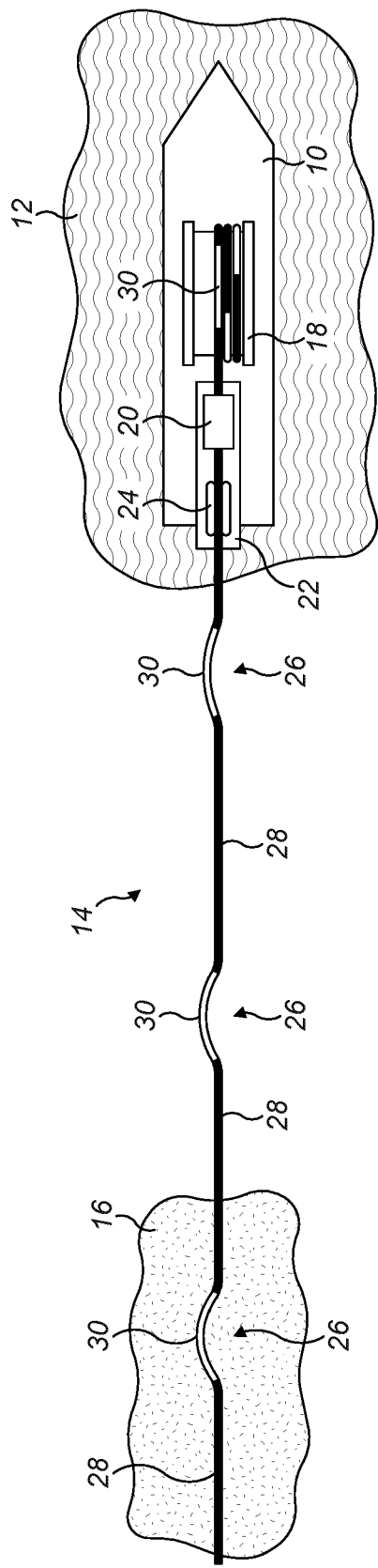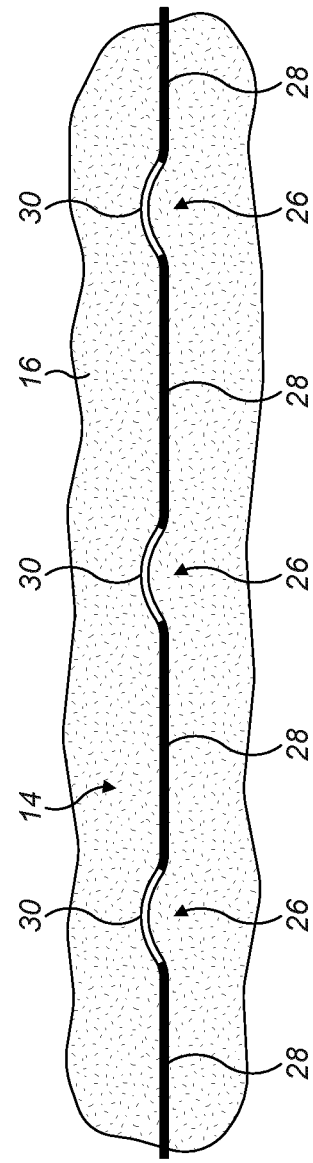

MITIGATION OF BUCKLING IN SUBSEA PIPELINES

This invention relates to the challenges of mitigating or controlling buckling during the installation and operation of subsea pipelines.

Subsea pipelines are used as 'tie-backs' to transport crude oil and/or natural gas from a subsea wellhead across the seabed on the way to the surface. Typically, in offshore locations, the oil and/or gas flows up a riser from the seabed to the surface to undergo treatment and temporary storage at a surface installation.

Subsea pipelines also take the form of jumper or spool pipes to interconnect items of subsea infrastructure that are required to be in fluid communication with each other.

Oil and gas are present in subterranean formations at elevated temperature and pressure, which may be increased by the injection of hot fluids such as steam. On production of the oil or gas, the hot produced fluid emerges from the wellhead and enters a subsea pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high despite thermal exchange with the surrounding seawater, which is invariably much colder.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. When production restarts, temperature within the pipeline must be increased quickly so that no plugs will form.

The challenges of thermal management increase as subsea pipelines become longer. In this respect, there is a trend toward longer tie-backs as oil and gas reserves are being exploited in increasingly challenging locations.

The thermal loads experienced by a subsea pipeline in use give rise to large axial forces in the pipe wall, especially when starting production or between shutting-down and restarting production. In particular, a pipeline that is subjected to an increase in temperature will tend to extend longitudinally. Resistance to thermal elongation due to friction and cohesion between the pipeline and the seabed soil results in axial compressive forces in the pipe wall which, in a long pipeline, can only be relieved by horizontal or vertical deflection, or buckling.

In principle, buckling may be prevented by covering the pipeline completely, for example by burying the pipeline in a backfilled trench. However, trenching the entire length of a long pipeline can be prohibitively expensive and may be impractical in any event. Thus, various other methods are known to mitigate or control the appearance of buckles in subsea pipelines. For example: buckle arresters or buckle triggers may be inserted into the pipeline at selected locations to prevent propagation of buckles or to initiate buckles in a controlled manner; buoys may be added to ease motion of the pipeline; or the pipeline may be anchored in some way.

Some pipelines are shaped to buckle at certain points along their length. In particular, creating curves or loops in the pipeline absorbs compressive forces and promotes the appearance of buckles in a controlled manner at selected locations. Thus, a common approach to mitigate buckling is to lay a pipeline along a sinuously-curved route in which an installation vessel incorporates thermal expansion loops along the length of the pipeline by following a zigzag course during laying. This technique is known in the art as 'snake lay' and is apt to be performed during S-lay, J-lay or reel-lay operations, especially S-lay operations. EP 2042794 describes a snake-lay process in which the pipeline is laid using guide posts to define the curved path for the pipeline. Alternatively, US 2008/232905 describes apparatus designed to impart localised curvature at points of a pipeline by applying horizontal force to regulate buckling of the pipeline.

Another buckle mitigation technique that similarly creates thermal expansion loops is the so-called 'residual curvature method' (RCM), which is based on the teachings of EP 1358420. The RCM exploits the conventional straightener system of a reel-lay installation vessel aboard which a pipeline is spooled and transported in a plastically-deformed state, typically with 2% bending strain. The pipeline passes through the straightener system, which generally comprises rollers, after being unspooled from a reel or carousel of the vessel. This reverses the plastic deformation that was imparted to the pipeline upon spooling.

In accordance with the RCM, the radius of curvature of the pipeline is modified locally by periodically changing the straightening force that is applied to the pipeline. Typically the pipeline is under-straightened locally at longitudinal intervals as the pipeline is launched into the sea. This forms a series of laterally-extending thermal expansion loops of locally-increased curvature—that is, with a locally-reduced radius of curvature—that are distributed longitudinally along the pipeline between straighter portions of lesser curvature, preferably with substantially uniform spacing between them.

However they are produced, the principle of thermal expansion loops is to reduce the longitudinal stiffness of selected portions of the pipeline corresponding to the loops, compared to the longitudinal stiffness of straighter portions of the pipeline disposed between the loops. This ensures that thermal elongation of the pipeline as a whole will occur in a distributed and controlled manner, causing the loops to deflect laterally without generating excessive compressive forces in the pipe wall.

In order for thermal expansion loops to work, there has to be local lateral movement of the pipeline relative to the seabed in directions transverse to the central longitudinal axis of the pipeline. Consequently, interaction with the seabed soil, especially friction, becomes a limiting factor in their effectiveness. In effect, the pipeline can engage and lock against the seabed soil frictionally, cohesively and/or mechanically, especially if the pipeline becomes embedded in the soil or, with a lateral scraping action over time, shapes the adjoining soil into a blocking ridge or ramp formation such as a berm.

To address this issue, WO 2013/066431 and BR PI0803572 teach the solution of mounting rollers around the pipeline to enable free lateral motion of the pipeline. However, such a solution elevates the centre of gravity of the pipeline and so potentially lowers the stability of the pipeline on the seabed soil. GB 2551786 describes a roller for use with such a system.

In CN 109695780, an inflatable high-pressure rubber sleeve is mounted on the outer side of the pipeline, supported by a sealed waterproof bearing. The sleeve and bearing can together act in a similar way to a roller, but the inflatable sleeve also acts to effectively reduce the underwater weight of the pipe, reducing the required buckling force further.

Another approach is to incorporate expansion loops into the pipeline in alignment with sleepers onto which the pipeline is laid. For example, WO 2014/147354 discloses how a preferential buckling loop may be generated by inserting a sleeper under the pipeline. However, installing sleepers on the seabed in this way takes time and is expensive.

GB 2492414 describes the use of ballast modules to define a sag bend in a pipeline hanging in a water column suspended from a pipelay vessel. The sag bend helps to bring a termination head of the pipeline and an adjoining region of the pipe closer to the horizontal during the initiation stage of the pipelaying procedure.

Finally, WO 2018/102196 describes expandable tube members fabricated from a structural plastic that undergoes permanent expansion when exposed to wellbore conditions. The tube member may comprise a coating at certain regions along the tube that can be used to reduce friction as the tube member is inserted into a pipe or wellbore.

Against this background, the invention provides a method of laying a subsea pipeline, the method comprising: launching the pipeline from an installation vessel, the pipeline having a friction-reducing outer coating, treatment or finish extending along discrete regions that are mutually spaced along the pipeline; and imparting curvature to the pipeline along its length during laying to create expansion loops of increased curvature relative to intermediate portions of the pipeline that join those loops, each of those loops being coincident with a respective one of the discrete regions.

Curvature may, for example, be imparted to the pipeline by adjusting straightening force as the pipeline is unspooled during laying, in accordance with the residual curvature method. In that case, the pipeline may be unspooled with the friction-reducing outer coating, treatment or finish already present in the discrete regions along the spooled pipeline. Thus, preliminarily, the method may involve: applying the friction-reducing outer coating, treatment or finish to pipe stalks; fabricating the pipeline from those pipe stalks; and spooling the pipeline thus fabricated onto the installation vessel. The pipeline may also be fabricated from additional pipe stalks that do not have the friction-reducing outer coating, treatment or finish.

Curvature may instead be imparted to the pipeline by steering the installation vessel along a corresponding course during laying. In this case, the pipeline could be fabricated from a succession of pipe joints aboard an installation vessel that follows a snake-lay path, at least one of those pipe joints bearing the friction-reducing outer coating, treatment or finish to define at least part of one of the discrete regions. Thus, preliminarily, the method may involve: applying the friction-reducing outer coating, treatment or finish to the at least one pipe joint; and loading the at least one pipe joint onto the installation vessel. The pipeline could also include additional pipe joints that do not have the friction-reducing outer coating, treatment or finish.

The inventive concept extends to a method of making a subsea pipeline, the method comprising applying a friction-reducing outer coating, treatment or finish to the pipeline, that outer coating, treatment or finish extending along two or more discrete regions that are mutually spaced along the pipeline. For example, a coating may be wrapped around the pipeline, a coating or treatment may be deposited onto the pipeline, or a treatment or finish may be applied by smoothing an outer surface of the pipeline. Other than any outer coating, treatment or finish, or any inner lining, the pipeline may be made of steel.

The outer coating, treatment or finish may be applied to one or more pipe stalks or pipe joints of the pipeline and then the or each pipe stalk or pipe joint may be joined to at least one other pipe stalk or pipe joint of the pipeline. A friction-increasing outer coating, treatment or finish could be applied to the pipeline between the discrete mutually-spaced regions.

Methods of laying a pipeline in accordance with the invention may involve, preliminarily, making the pipeline in accordance with the invention.

The inventive concept also embraces a subsea pipeline laid with curvature along its length, the pipeline comprising expansion loops of increased curvature relative to intermediate portions of the pipeline that join those loops, wherein the loops are coincident with respective discrete regions of the pipeline each having a friction-reducing outer coating, treatment or finish, said regions being mutually spaced apart along the length of the pipeline.

Successive expansion loops of the pipeline may lie to the same side of a central longitudinal axis of the pipeline. Alternatively, successive expansion loops of the pipeline may bend in mutually-opposed directions parallel to a supporting seabed.

The outer coating, treatment or finish may, for example, comprise a paint or nano-coating deposited on the pipeline, or a wrapping that encircles the pipeline, or a smoothed outer surface of the pipeline. The intermediate portions of the pipeline could have a friction-increasing outer coating, treatment or finish.

Thus, aspects of the invention involve the use of a low-friction treatment or coating on at least one expansion loop of a pipeline, for example along a short section of a residual curve produced by the residual curvature method. This reduces friction between the pipeline and the adjoining seabed soil within the length of the loop. The reduced friction reduces the buckling force that is required to move the pipeline laterally at the loop location and so lowers the risk of rogue buckles appearing in the pipeline.

Conversely, the longitudinally-adjoining straighter sections of the pipeline that have greater friction with the contacting seabed soil are more resistant to lateral movement. This restrains movement of the pipeline in sections that are not intended to move laterally and so also militates against the appearance of rogue buckles. Thus, the inventive concept could also be realised by the use of a higher-friction treatment or coating on a section of a pipeline that adjoins at least one expansion loop of the pipeline.

It will be apparent that the treatments or coatings of the invention are longitudinally discontinuous or spaced apart from their counterparts along the length of the pipeline. The treatments or coatings of the invention may be aligned with respective sections of greater and/or lesser curvature as appropriate, which sections alternate with each other longitudinally along the length of the pipeline.

If it is partially embedded in seabed soil, the pipeline will experience some passive resistance to lateral movement. However, as passive pressure from the soil is strongly dependent upon the roughness of, and friction at, the interface between the soil and pipeline, the invention will usefully reduce lateral resistance even if the pipeline has become somewhat embedded.

The low-friction coating or finish need not last for the lifetime of the pipeline. This is because break-out of buckles is most likely, and reduced resistance to lateral movement is therefore most important, during the initial few years of service in which the pipeline experiences its first thermal cycles. After this initial phase, rogue buckles are less likely to develop and therefore the efficacy of the coated or treated surface becomes less important. In any event, if some of the low-friction surface falls off the pipeline, dissolves or otherwise deteriorates, the expansion loop will still have less resistance as a whole for as long as a majority of, or at least some of, that surface is still intact.

A low-friction coating for use in the invention may, for example, be a paint or a nano-coating, also known as a ceramic coating, applied to the pipeline as a surface layer that repels water and soil particles. Such a nano-coating may have anti-abrasion characteristics to lessen friction between the pipeline and the seabed soil.

The low-friction coating could instead comprise a layer of low-friction material that is wrapped around the pipeline, such a strip of PTFE that is wound over a thermal insulation coating of the pipeline.

In a broad sense, it is not essential to apply a distinct low-friction coating to sections of the pipeline. In particular, applying a low-friction treatment may involve conferring a low-friction finish on discrete sections of the pipeline corresponding to the thermal expansion loops. For example, the exterior of the pipeline could be polished locally to define a section that has a substantially smoother surface finish than longitudinally-adjacent sections of the pipeline that have a relatively rough surface finish. Alternatively, or additionally, the longitudinally-adjacent sections of the pipeline could have a roughened or otherwise higher-friction surface finish or coating.

The invention is an improvement of prior art solutions such as rollers and sleepers to optimise the initiation and development of preferential buckles. For example, the invention reduces the effect of a soil berm on the loop, which can appear due to lateral motion of the pipeline over time and could eventually limit or jam the motion. The low-friction coating reduces the impact of the berm because the pipeline can more easily slide up and over the berm or through the berm.

Embodiments of the invention implement a method to mitigate buckling of a section of underwater pipeline, such as a spool or a jumper. The method comprises: identifying preferred locations for controlled buckling; coating the pipeline with a low-friction coating at the preferred locations; and installing the pipeline underwater with local higher curvature at the preferred location.

The pipeline may, for example, be installed in a reel-lay operation, in which case local high curvature may be imparted to the pipeline by the residual curvature method. Alternatively, the pipeline may be installed in an S-lay operation, in which case local high curvature may be imparted to the pipeline by the snake-lay method.

Local high curvature may involve laying the preferred location on a sleeper or other support on the seabed.

The low friction coating or treatment may be formed over or applied to a thermal insulation coating of the pipeline.

In reel-lay applications, the low friction coating or treatment is suitably formed or applied before spooling the pipeline on a reel. In S-lay or J-lay applications, the low friction coating or treatment is suitably formed on or applied to pipe joints before those pipe joints are welded to the upper end of the pipeline. However it may also be possible to apply a suitable coating or treatment to the pipeline or to its constituent pipe joints aboard a pipelay vessel.

In summary, a subsea pipeline of the invention has a friction-reducing outer coating, treatment or finish applied to discrete regions that are mutually spaced along the length of the pipeline. During laying, curvature is imparted to the pipeline along its length, for example by the residual curvature method or by snake-lay, to create expansion loops of increased curvature relative to intermediate portions of the pipeline that connect those loops. Each of the loops is coincident with region that bears the friction-reducing outer coating, treatment or finish. The consequent reduction in friction eases lateral movement of the loops relative to the seabed to mitigate and control buckling in use of the pipeline.

In order that the invention may be more readily understood, reference will now be made, by way of example, to the accompanying drawings in which:

FIG. 1 is a schematic plan view of a pipeline of the invention being reel-laid from a pipelay vessel that employs an RCM technique to impart locally-increased curvature to portions of the pipeline spaced at longitudinal intervals;

FIG. 2 is a schematic plan view of the pipeline of FIG. 1 now laid on the seabed;

Figure 5B:
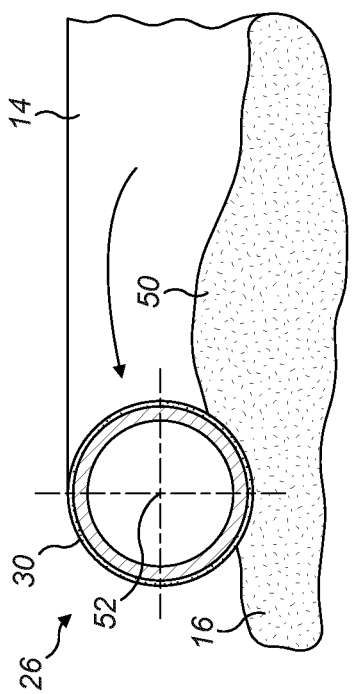
Figure 5A:
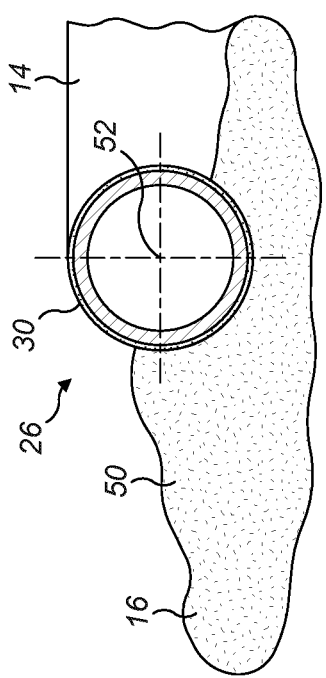
Figure 8:
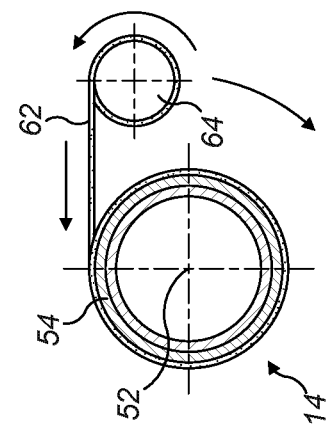
Figure 7:
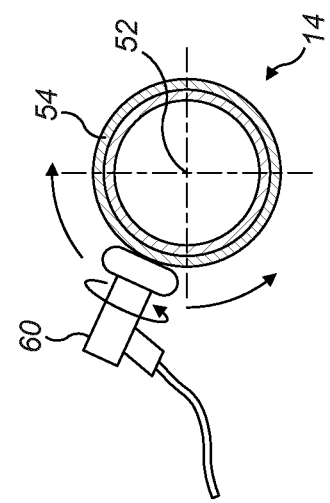
Figure 6:
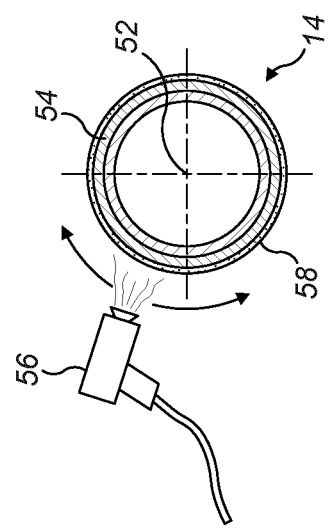

FIGS. 5(*a*) and 5(*b*) are a sequence of schematic cross-sectional views that show a low-friction, high-curvature section of a pipeline of the invention surmounting a berm of seabed soil when deflecting laterally in response to thermal elongation; and FIGS. 6, 7 and 8 are schematic cross-sectional views that show various techniques for applying a coating, treatment or surface finish to a pipeline of the invention.

Referring firstly to FIG. 1 of the drawings, a conventional reel-lay vessel 10 is shown here travelling across the surface 12 of the sea while laying a pipeline 14 of the invention onto the seabed 16. The pipeline 14 is nominally rigid, having been fabricated onshore from lengths of steel pipe as will be explained with reference to FIG. 3. However, the pipeline 14 has sufficiently flexibility to bend along its length. This bending deformation remains in the elastic domain provided that an appropriate minimum bending radius (MBR) is observed.

Figure 3:
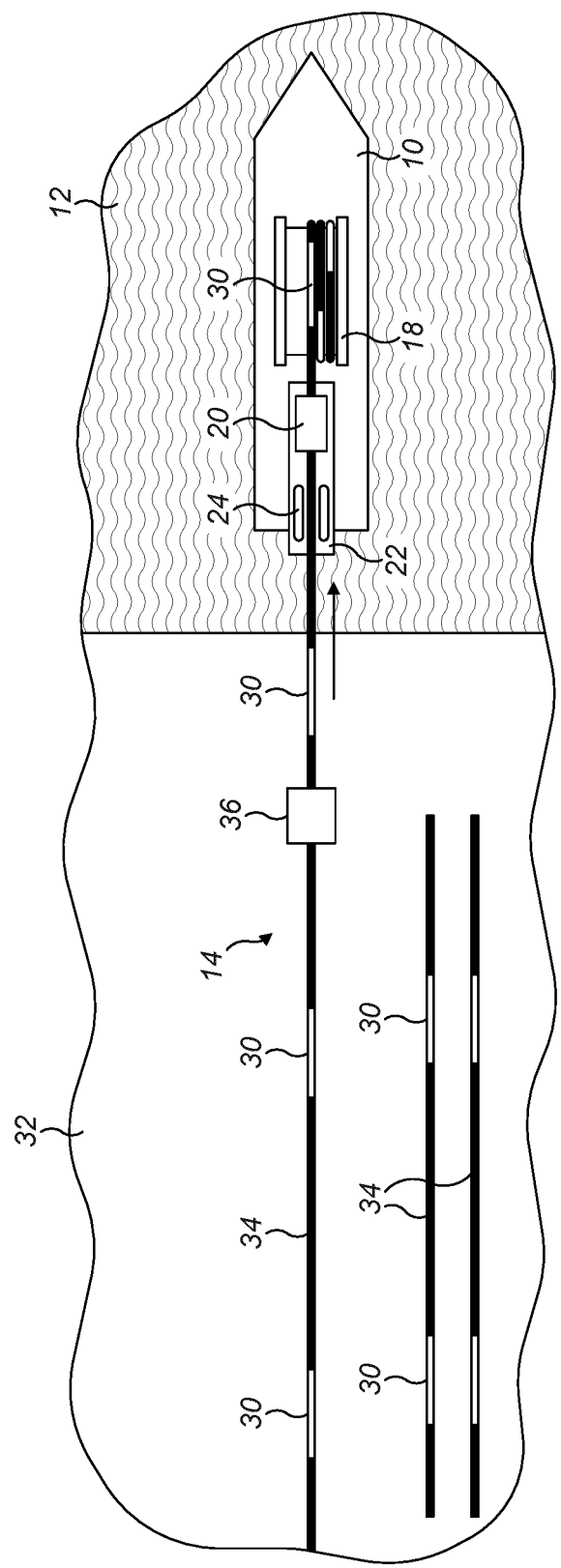
FIG. 3 is a schematic plan view of a coastal spoolbase at which a pipeline of the invention is being fabricated and spooled onto the reel of the pipelay vessel shown in FIG. 1.

As is conventional, the vessel 10 carries a reel 18, in this example turning about a horizontal axis, onto which the pipeline 14 is spooled during fabrication as shown in FIG. 3 for transport to the installation site. The bending deformation involved in spooling the pipeline 14 onto the reel 18 exceeds the MBR and hence the elastic limit, thus imparting plastic deformation to the pipe. Consequently, after being unspooled from the reel 18 and before being launched into the sea, the pipeline 14 is guided through a straightener system 20 that imparts a suitable degree of reverse plastic deformation to the pipe wall.

The straightener system 20 is mounted on an inclined laying ramp 22 that extends over the stern of the vessel 10. The laying ramp 22 also comprises a hold-back system 24 that typically comprises tensioners and clamps for supporting the weight of the pipeline 14 suspended as a catenary between the vessel 10 and the seabed 16.

In this example, the straightener system 20 is controlled in accordance with the residual curvature method (RCM), periodically to reduce the straightening force that imparts reverse plastic deformation to the pipeline 14. As a result, the pipeline 14 is under-straightened locally at longitudinal intervals while being launched into the sea. This creates thermal expansion loops 26 in accordance with the principles set out in EP 1358420 as noted above.

The expansion loops 26 are portions of the pipeline 14 whose curvature is increased locally relative to intervening straighter intermediate portions 28 of substantially lesser curvature. In other words, the expansion loops 26 have a substantially smaller radius of curvature than the intermediate portions 28 extending between them. Typically the radius of curvature of the expansion loops 26 is between 20 m and 200 m, preferably equivalent to the length of the expansion loop 26. Transition sections effect smooth curvature transition between the straighter intermediate portions 28 and the expansion loops 26.

Preferably there is substantially uniform spacing between the expansion loops 26 as shown. The expansion loops 26 alternate with the intermediate portions 28 along the length of the pipeline 14. The intermediate portions 28 have a substantially greater radius of curvature than that of the expansion loops 26. Indeed, the radius of curvature of an intermediate portion 28 may approach infinity if that intermediate portion 28 is substantially straight.

It should be noted that the drawings are not to scale. Each expansion loop 26 may be less than 100 m long; more generally, the expansion loops 26 may represent less than 10%, possibly even less than 1%, of the overall length of the pipeline 14.

In view of the path of the pipeline 14 from the reel 18, over the laying ramp 22 and through the straightener system 20, the expansion loops 26 are typically upwardly convex in a vertical plane on being launched into the sea. As the pipeline 14 is lowered toward the seabed 16, the expansion loops 26 all tend to fall to one side as the pipeline 14 twists about its central longitudinal axis, eventually lying in a substantially horizontal plane on reaching the seabed 16 as shown in the plan view of FIG. 2.

Turning next, then, to FIG. 2, the pipeline 14 is shown here initially surface-laid onto the seabed 16. To the extent that the seabed 16 is generally planar, the pipeline 14 and its expansion loops 26 therefore initially lie in a plane that is substantially parallel to the seabed 16 and so is, typically, substantially horizontal or, at most, shallowly-inclined.

In practice, the seabed 16 may be somewhat irregular or undulating and therefore the pipeline 14 may not be perfectly planar once laid. Also, as soft seabed soil may yield somewhat under the weight of the pipeline 14 and the forces of installation, the pipeline 14 may settle slightly beneath the general level of the immediately surrounding or adjoining seabed 16.

In accordance with the invention, the expansion loops 26 of the pipeline 14 experience substantially lower friction with the soil of the seabed 16 than the intermediate portions 28 of the pipeline 14. This is achieved by applying a relatively low-friction coating or treatment 30 to at least part of the length of each expansion loop 26. The coating or treatment 30 suitably extends continuously around the pipeline 14 in a circumferential direction, like a band. However, the coating or treatment 30 is longitudinally discontinuous or interrupted by elongate gaps between successive coated or treated regions, corresponding to the intermediate portions 28 of the pipeline 14.

Possibly, the low-friction coating or treatment 30 may be applied to the entire length of each expansion loop 26. The low-friction coating or treatment 30 could even extend longitudinally slightly beyond the expansion loops 26, hence around the transitions and onto the intermediate portions 28 that extend between the expansion loops 26. It may also, or instead, be possible to apply a higher-friction coating or treatment to at least part of the length of each intermediate portion 28.

In this example, the low-friction coatings or treatments 30 that will be in longitudinal alignment with the expansion loops 26 are pre-applied to the appropriate longitudinal positions on the pipeline 14 before the pipeline 14 is spooled onto the reel 18. In this respect, FIG. 3 shows the reel-lay vessel 10 being loaded at a coastal spoolbase 32 at which the pipeline 14 is fabricated from a succession of pipe stalks 34 joined end to end. A new pipe stalk 34 is added to the trailing end of the pipeline 14 at one or more welding and coating stations 36 and the thus-extended pipeline 14 is spooled onto the reel 18 of the visiting vessel 10.

In the example shown in FIG. 3, the low-friction coatings or treatments 30 are pre-applied to the pipe stalks 34 and so are incorporated into the pipeline 14 in the corresponding positions as the pipeline 14 is assembled from those pipe stalks 34. The coatings or treatments 30 then end up spooled onto the reel 18 with the underlying pipeline 14. For this purpose, it is beneficial for the coatings or treatments 30 to have sufficient flexibility and resilience to withstand the typical bending strain that is experienced by the pipeline 14 during spooling and during subsequent unspooling and straightening processes. In this way, spooling, unspooling and straightening processes should not be to the significant detriment of the integrity and/or adhesion of the coatings or treatments 30.

In principle, it would be possible instead to apply the low-friction coatings or treatments 30 to the pipeline 14 immediately after attaching each new pipe stalk 34. However, post-application of the low-friction coatings or treatments 30 in that way would lie on the critical path of the vessel-loading operation and so is less preferred. In this respect, a key objective of the spoolbase 32 is to maximise the time that the vessel 10 can spend working at sea, as opposed to remaining in dock for loading.

Other pipelay techniques, notably S-lay and J-lay operations, involve fabricating a pipeline at sea. In this respect, FIG. 4 exemplifies an S-lay operation in which a pipeline 14 of the invention is fabricated from a succession of pipe joints 38 along a horizontal firing line of a pipelay vessel 40. On the firing line, the pipeline 14 passes through one or more welding/testing stations 42 at which each new pipe joint 38 is added and then a coating station 44 at which a field joint coating is applied to the welded joint. The pipeline 14 is then launched into the sea over a stinger 46, while a tensioner system 48 applies the hold-back force that is required to support the weight of the pipeline 14 suspended between the vessel 40 and the seabed 16.

Figure 4:
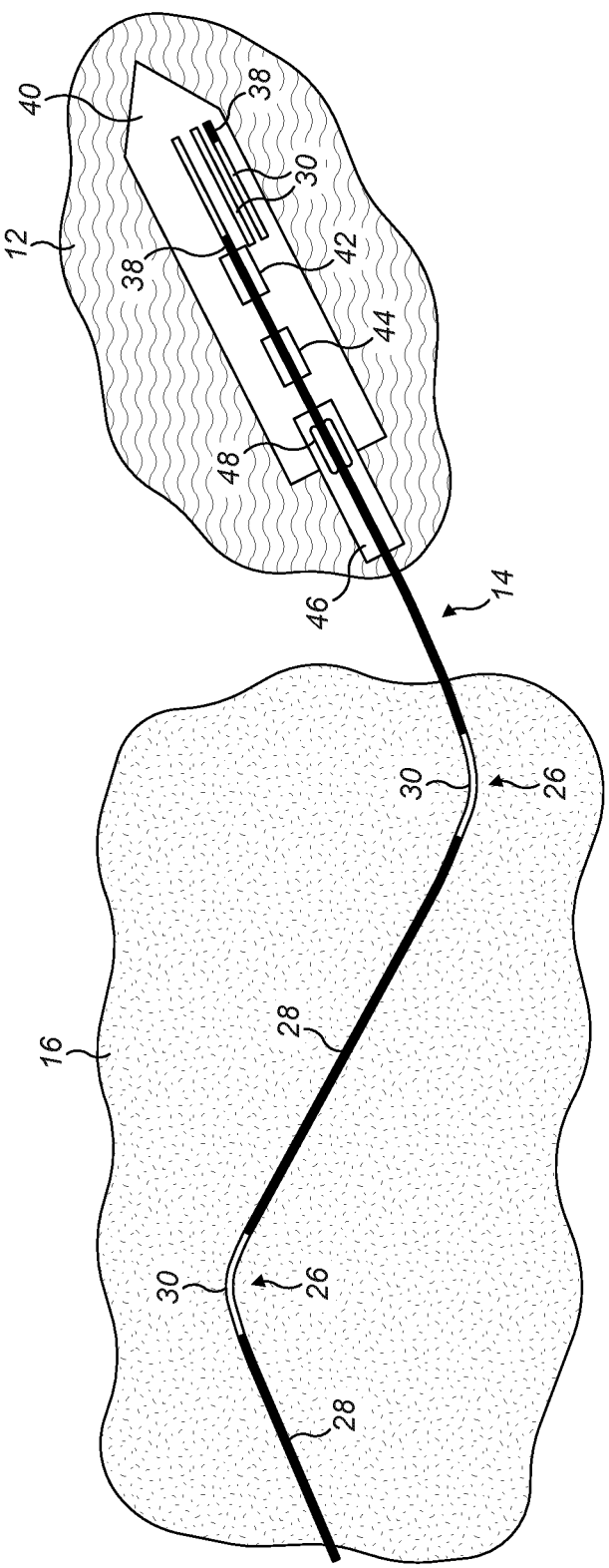
FIG. 4 is a schematic plan view of a pipelay vessel configured for S-lay operations in the process of fabricating and laying a pipeline of the invention on the seabed in a snake-lay configuration.

In this example, the pipelay vessel 40 is following a zigzag course that characterises a snake-lay operation, although snake-lay may also be used in conjunction with reel-lay or J-lay techniques as noted above. As a result, the pipeline 14 follows a corresponding course on the seabed 16, in which relatively straight intermediate portions 28 of the pipeline 14 are separated by expansion loops 26 of substantially greater curvature. Also, successive expansion loops 26 bend in mutually-opposed directions parallel to the seabed 16. Again, the schematic drawing of FIG. 4 is not to scale.

The invention is also beneficial in these circumstances. Consequently, the pipe joints 38 corresponding to the positions of the expansion loops 26 in the completed pipeline 14 may have low-friction coatings or treatments 30 pre-applied to them as shown in FIG. 4. Indeed, substantially the entire length of a pipe joint 38 may have such a coating or treatment 30, it being likely that more than one pipe joint 38 will be necessary to define the full length of an expansion loop 26. Similarly, pipe joints 38 corresponding to an intermediate portion 28 could have a relatively high-friction coating or treatment 30 pre-applied to them.

Again, in principle, it would be possible instead to apply the low-friction coatings or treatments 30 to the pipeline 14 on the firing line after adding each new pipe joint 38. However, such post-application of the low-friction coatings or treatments 30 would lie on the critical path of the pipelay operation and so is less preferred.

FIGS. 5(*a*) and 5(*b*) illustrate a beneficial effect of a low-friction coating or treatment 30 on a subsea pipeline 14 shaped with expansion loops 26. These drawings show the pipeline 14 in cross-section through one of the expansion loops 26 when laid on the seabed 16. The pipeline 14 is somewhat embedded in the soft soil of the seabed 16.

It will be apparent from FIG. 5(*a*) that installation or previous lateral movement of the pipeline 14 has shaped the adjoining soil of the seabed 16 into a raised berm 50 that extends beside the pipeline 14. This berm 50 presents a risk of blocking further lateral movement of the pipeline 14 in that direction, orthogonal to the central longitudinal axis 52 of the pipeline 14. However, as shown in FIG. 5(*b*), the low-friction coating or treatment 30 helps the pipeline 14 to climb up and over or, to some extent, through the berm 50, hence surmounting, slipping over and possibly also helping to flatten that potential obstacle. The pipeline 14 is then free to move further laterally relative to the seabed 16, a movement that the low-friction coating or treatment 30 will continue to ease to the benefit of controlling buckling of the pipeline 14 in use.

The resistance to lateral movement of the pipeline 14 past the berm 50 is determined by soil contact under the pipeline 14 and by the resistance of the berm 50 itself. The invention can remove some of the passive resistance of the berm 50 and most of the friction under the pipeline 14.

The resistance of the berm 50 to lateral movement of the pipeline 14 may be calculated on the basis of a passive soil coefficient that depends upon the degree of roughness between the pipeline 14 and the soil of the seabed 16. In clay soils, this factor could be termed Kc. Typically if the roughness is zero, then Kc=2; conversely, if the pipeline is fully stuck on the soil, Kc=2.6.

Turning finally to FIGS. 6, 7 and 8, these schematic drawings show various techniques for applying a discrete low-friction outer coating, treatment or surface finish to make a pipeline 14 of the invention. In these examples, the pipeline 14 comprises at least one outer layer of thermal insulation 54 such as polypropylene. The coating, treatment or surface finish is therefore applied to the exterior of this thermal insulation 54.

FIG. 6 shows a paint gun 56 spraying a low-friction paint coating or nano-coating 58 onto the exterior of the pipeline 14. FIG. 7 shows a rotary polisher 60 imparting a smoother surface to the exterior of the pipeline 14. FIG. 8 shows a low-friction band, strip or tape 62 being deployed from a contra-rotating drum 64 and wrapped around the pipeline 14. The band, strip or tape 62 may be made of a low-friction material such as PTFE or may be coated with such a low-friction material.

Techniques for applying a low-friction outer coating, treatment or surface finish could, of course, be used in combination with each other. For example, a coating 58 as shown in FIG. 6 or a band, strip or tape 62 or other wrap as shown in FIG. 8 could be polished as shown in FIG. 7 or otherwise treated after its application to the pipeline 14.

In FIGS. 6, 7 and 8, the paint gun 56, the polisher 60 or the drum 64, as the case may be, may be moved circumferentially around the pipeline 14 as shown. The pipeline 14 may instead, or additionally, be turned about its central longitudinal axis 52 to effect such relative circumferential movement.

Similar provisions may be made if it is desired to impart a high-friction outer surface to other sections of the pipeline 14, in particular those corresponding to the intermediate portions 28. For example, the polisher 60 of FIG. 7 could be replaced by a tool for applying a rougher texture to the outer surface of the pipeline 14.

The invention claimed is:

1. A method of laying a subsea pipeline on a seabed, the method comprising:
   launching the subsea pipeline from a pipelaying installation vessel, the subsea pipeline having an outer coating, surface treatment or surface finish extending along discrete regions that are mutually spaced along the subsea pipeline for reducing friction in those discrete regions between an outer surface of the pipeline and soil of the seabed; and
   imparting curvature along the length of the subsea pipeline during laying to create expansion loops of increased curvature relative to intermediate portions of the subsea pipeline that join those loops, each of those loops being coincident with a respective one of the discrete regions,
   wherein, once laid, the subsea pipeline and the expansion loops lie in a plane that is substantially parallel to the seabed.

2. The method of claim 1, comprising imparting said curvature to the pipeline by adjusting straightening force as the pipeline is unspooled during laying, in accordance with a residual curvature method.

3. The method of claim 2, comprising unspooling the pipeline with the friction-reducing outer coating, surface treatment or surface finish already present in the discrete regions along the spooled pipeline.

4. The method of claim 3, comprising, preliminarily: applying the friction-reducing outer coating, surface treatment or surface finish to pipe stalks; fabricating the pipeline from those pipe stalks; and spooling the pipeline thus fabricated onto the installation vessel.

5. The method of claim 4, comprising also fabricating the pipeline from additional pipe stalks that do not have the friction-reducing outer coating, surface treatment or surface finish.

6. The method of claim 1, comprising imparting said curvature to the pipeline by steering the installation vessel along a corresponding course during laying.

7. The method of claim 6, comprising fabricating the pipeline from a succession of pipe joints aboard the installation vessel, at least one of those pipe joints bearing the friction-reducing outer coating, surface treatment or surface finish to define at least part of one of the discrete regions.

8. The method of claim 6, comprising also fabricating the pipeline from additional pipe joints that do not have the friction-reducing outer coating, surface treatment or surface finish.

9. The method of claim 7, comprising, preliminarily: applying the friction-reducing outer coating, surface treatment or surface finish to the at least one pipe joint; and loading the at least one pipe joint onto the installation vessel.

10. The method of claim 1, comprising preliminarily making the pipeline by applying the outer coating, surface treatment or surface finish to a pipeline made of steel, said outer coating, surface treatment or surface finish extending along two or more discrete regions that are mutually spaced along the pipeline.

11. The method of claim 10, comprising wrapping said outer coating around the pipeline.

12. The method of claim 10, comprising depositing said outer coating or surface treatment onto the pipeline.

13. The method of claim 10, comprising applying said surface treatment or surface finish by smoothing an outer surface of the pipeline.

14. The method of claim 10, comprising applying said outer coating, surface treatment or surface finish to one or more pipe stalks or pipe joints of the pipeline and then joining the or each pipe stalk or pipe joint to at least one other pipe stalk or pipe joint of the pipeline.

15. The method of claim 10, comprising applying a friction-increasing outer coating, surface treatment or surface finish to the pipeline between said discrete mutually-spaced regions.

16. A subsea pipeline laid on a seabed with curvature along the length of the subsea pipeline, the subsea pipeline comprising expansion loops of increased curvature relative to intermediate portions of the subsea pipeline that join those loops, wherein the loops are coincident with respective discrete regions of the subsea pipeline each having an outer coating, surface treatment or surface finish for reducing friction in those discrete regions between an outer surface of the pipeline and soil of the seabed relative to the friction between the outer surface of the subsea pipeline and the soil of the seabed in the intermediate portions of the subsea pipeline, said regions being mutually spaced apart along the length of the subsea pipeline, wherein the subsea pipeline and the expansion loops lie in a plane that is substantially parallel to the seabed.

17. The pipeline of claim 16, wherein successive expansion loops of the pipeline lie to the same side of the pipeline.

18. The pipeline of claim 16, wherein successive expansion loops of the pipeline bend in mutually-opposed directions parallel to a supporting seabed.

19. The pipeline of claim 16, wherein said outer coating, surface treatment or surface finish comprises a paint or nano-coating deposited on the pipeline.

20. The pipeline of claim 16, wherein said outer coating, surface treatment or surface finish comprises a wrapping that encircles the pipeline.

21. The pipeline of claim 16, wherein said outer coating, surface treatment or surface finish comprises a smoothed outer surface of the pipeline.

22. The pipeline of claim 16, wherein the intermediate portions of the pipeline have a friction-increasing outer coating, surface treatment or surface finish.

* * * * *